July 14, 1964  R. A. BILANCIA  3,140,851
VEHICLE SEAT SUPPORT
Filed Sept. 6, 1961  3 Sheets-Sheet 1
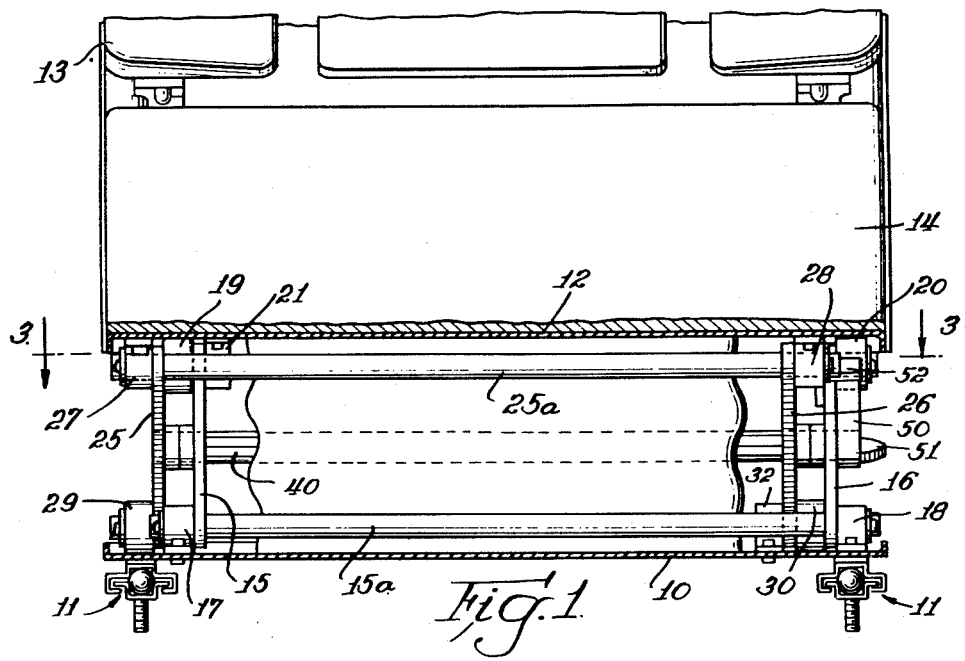
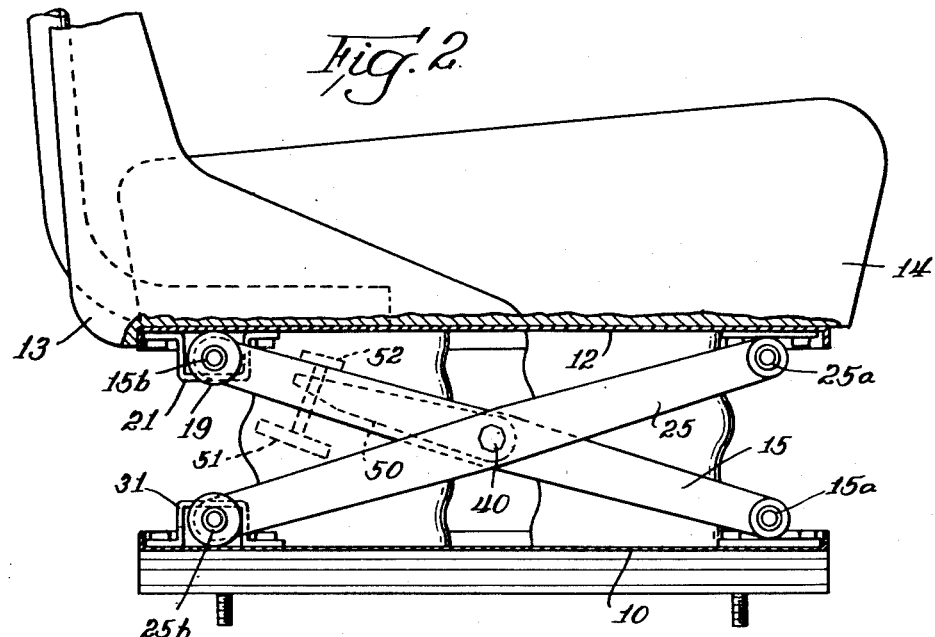
INVENTOR
Raymond A. Bilancia
By Morrison, Smith & Marshall
Att'ys

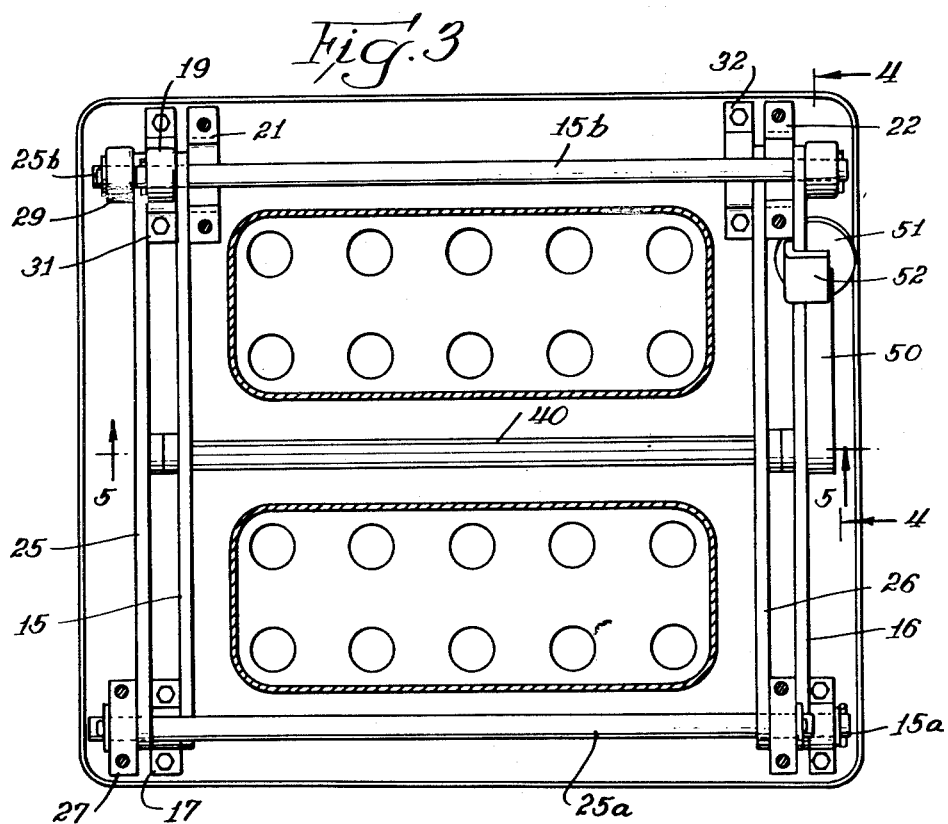
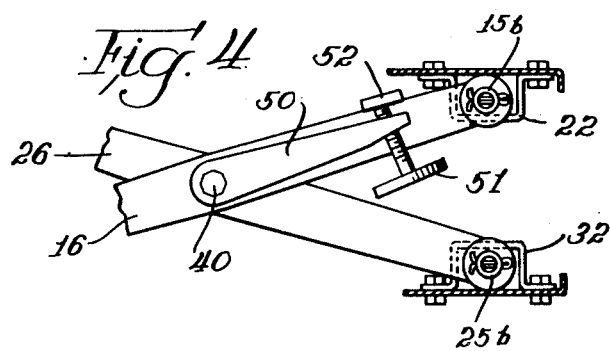

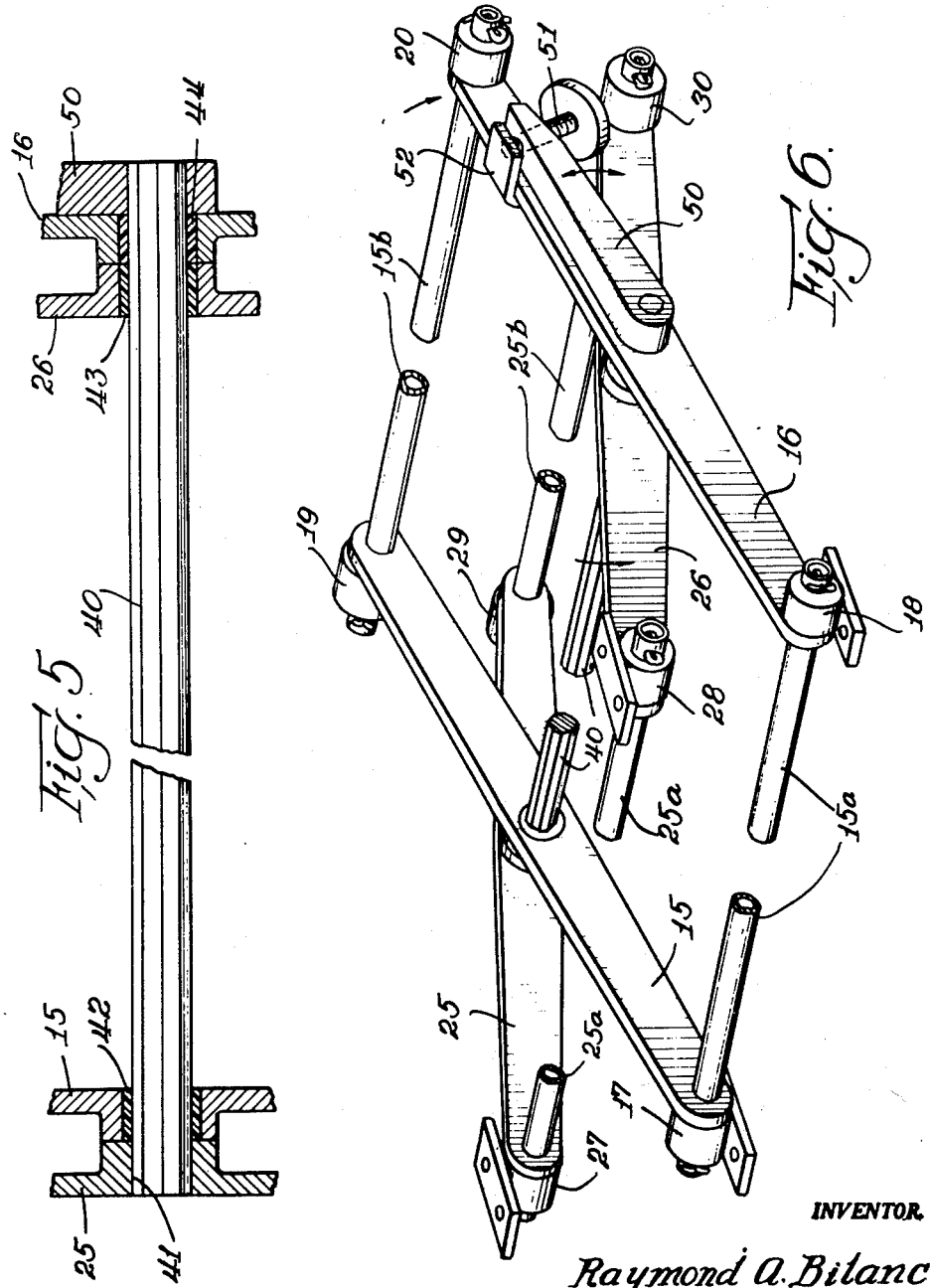

3,140,851
VEHICLE SEAT SUPPORT
Raymond A. Bilancia, Rolling Meadows, Ill., assignor to Coach and Car Equipment Corporation, Chicago, Ill., a corporation of Illinois
Filed Sept. 6, 1961, Ser. No. 136,292
11 Claims. (Cl. 248—399)

This invention relates generally to vehicle seat supports and more particularly to a resilient support utilizing a torsion bar which is twisted when the seat is loaded.

Vehicle seats, and especially seats for trucks and the like, are commonly supported by resilient means in order to provide a comfortable ride for the rider. Heretofore, floating suspensions for seats have employed either metal coil springs or springs formed of elastic material such as rubber. Coil springs are not satisfactory, as they do not provide a comfortable ride. Moreover, it is not possible to adjust the amount of movement of the seat. Elastic springs have been employed which consist of a member to which two different portions of the suspension are attached and springs are placed under torsion by the weight of the person on the seat. Such springs are unduly large and bulky and do not lend themselves to use with relatively low seats such as commonly used on trucks. Moreover, such springs are expensive.

In accordance with the present invention, a support mechanism is provided wherein the seat is supported by a pair of levers each connected to a metal torsion bar in such manner that when the seat is loaded, the torsion bar is twisted. The inherent resiliency of the metal forming the bar provides a yieldable resistance to the downward movement of the seat when a weight is placed thereon which offers a comfortable ride. The invention also provides a support mechanism which can be adjusted to vary the extent of movement of the seat on its support and consequently the amount of torsion placed on the torsion bar.

Other features and advantages of the invention will appear from the following description taken in connection with the appended drawings wherein:

FIGURE 1 is a fragmentary front elevational view of the seat constructed in accordance with the invention;

FIGURE 2 is a side elevational view of the seat of FIGURE 1;

FIGURE 3 is a horizontal sectional view taken along line 3—3 of FIGURE 1;

FIGURE 4 is a fragmentary view of adjusting mechanism;

FIGURE 5 is a fragmentary enlarged view showing the mounting of the torsion bar in the levers; and FIGURE 6 is a perspective view showing the seat supporting mechanism.

The seat of the present invention includes a base plate 10 which is mounted for fore and aft movement on suitable guide assemblies 11 (FIGURE 1) of conventional construction. Disposed above the base plate and supported by a resilient supporting mechanism, hereinafter described, is a seat plate 12 adapted to carry a back 13 and a seat cushion 14.

The seat plate 12 is supported by a supporting mechanism which includes a first pair of levers 15 and 16 which are mounted at their forward and lower ends on a shaft 15a pivoted in bearings 17 and 18, fixedly secured to the base plate 10 adjacent its forward end. At their rearward ends, the levers 15 and 16 carry a shaft 15b on which is mounted rollers 19 and 20 on which the seat plate rests, said rollers being movable in a back and forth direction through a distance limited by guides 21 and 22, respectively, secured to the seat plate 12 adjacent its rear end.

A second pair of levers 25 and 26 are provided which carry at their upper ends a shaft 25a which is rotatable in bearings 27 and 28 attached to the seat plate 12 at its forward end and on the opposite sides thereof. The downward and rearward ends of the levers 25 and 26 carry a shaft 25b which, in turn, carries rollers 29 and 30 which rest on the base plate 10 and are movable in guides 31 and 32 which are secured to the base plate 10 and which limit the movement of rollers 29, 30 in a horizontal back and forth direction.

The pairs of levers 15, 16 and 25, 26 are so arranged that the lever of each pair at one side of the seat assembly crosses the corresponding lever of the other pair providing, in effect, a scissor mechanism at each of the two sides of the seat assembly.

Extending through the levers 25, 15, 26 and 16 is a torsion bar 40. The torsion bar extends through the centers of each of the levers, where the transverse levers intersect. Positioning the torsion bar thereat results in the application of less torque to the torsion bar per unit load on the seat in comparison to the torque resulting from positioning the torsion bar at a point remote from the centers of the levers. For example, in a typical embodiment, a center-positioned torsion bar capable of withstanding 2500 in. lbs. of torque is satisfactory, whereas two torque bars of the same properties would be required if the position were at the ends of the levers. Accordingly, a less expensive torsion means, not requiring relatively high torque absorbing characteristics, may be utilized when practicing the present invention.

The torsion bar is formed of resilient metal such as steel and may be of any cross-section, an octagonal bar being illustrated. The lever 25 is non-rotatably secured on the torsion bar by an octagonal opening 41 in lever 25 through which the torsion bar passes, said opening closely fitting the torsion bar. The levers 15 and 26 rotatably receive the torsion bar 40. To this end, bushings 42 and 43 are provided which have an outer circular shape fitted into a circular bore in the corresponding lever and an inner octagonal bore fitting the torsion bar 40. Thus, the levers may rotate relative to the torsion bar 40.

The lever 16 has a bushing 44 which receives the torsion bar 40 in a manner similar to that described in connection with the levers 15 and 26. However, the lever 16 is non-rotatably attached to the torsion bar 40 by a mechanism now to be described.

Secured on the end of the torsion bar 40, which projects beyond the lever 16, is an adjusting lever 50 having an octagonal bore which receives the torsion bar and is thus mounted non-rotatably on the torsion bar. A screw 51 is threaded through the adjusting lever 50 near the free end thereof and is adapted to abut a stop 52 carried rigidly on the lever 16 at a substantial distance from the torsion bar 40. Upon turning the screw 51 in one direction or the other, the angular position of the lever 16 relative to the lever 50, and therefore relative to the torsion bar 40 and the lever 25, is adjusted accordingly.

Thus the adjustment of the screw 51 determines the initial angular position of the levers 25 and 16 relative to each other, and the initial separation between the seat plate 12 and the base plate 10. As the obtuse angle between the levers 25 and 16 is decreased, the seat plate 12 is raised vertically relative to the base plate 10; and the available angle of twist through which the torsion bar can act when loaded is increased. This increase allows for the support of additional weight over and above that for which the mechanism had been previously set. This adjustment is provided to accommodate riders of different weights so that the level of the seat when loaded (the "ride level") is approximately the same. For example, when the rider is heavy the angle between levers 16 and 50 is increased, thereby decreasing the obtuse angle between levers 16 and 25 and allowing the torsion bar when loaded to twist through a greater angle before the desired "ride level" is obtained. Conversely, when the rider is light the angle between the levers 16 and 50 is decreased, thereby increasing the obtuse angle between levers 16 and 25 and decreasing the angle through which the torsion bar is twisted before the loaded seat attains the "ride level" desired. Thus, the adjustment of the mechanism for various ride levels or seat loads is made by prepositioning the levers 16 and 25 relative to the torsion bar and not by preloading the torsion bar itself, and the loaded vertical level of the seat is the same for any given load.

In use, when a load is placed on the seat, for example, when the operator sits down, the seat plate 12 moves downwardly toward the base plate 10. This causes the levers 15 and 16 to be rotated downwardly about their pivot shaft 15a, the rollers 19 and 20 rolling along the bottom of the seat plate 12 to permit this action to take place. At the same time, the pivoted ends of the levers 25 and 26 are moved downwardly by the downward movement of the seat plate, thus rotating these levers about a moving pivot comprising the axis of the shaft 25b, the rollers 29 and 30 rolling along the base plate 10 to permit this action to take place. Thus, it will be seen that the scissor mechanisms at the two sides of the structure are moved toward closed positions at the same rate allowing the seat plate 12 to move vertically without any fore and aft movement. By reason of the fact that the lever 25 is secured non-rotatably to the torsion bar 40 and the lever 16 is secured non-rotatably to the torsion bar 40 (through the adjusting lever 50, the screw 51, and the stop 52), the relative angular movement between the lever 25 and the lever 16 exerts an angular twist on the torsion bar 40 which causes the torsion bar to store the energy of the applied load. Thus, the supporting mechanism for the seat allows the seat to move downwardly a certain distance, depending upon the weight of the user, whereafter the motion is halted by the resistance of the torsion bar to the applied load. When the load is removed from the seat, the stored energy in the torsion bar returns the levers and the seat to their initial positions.

The initial angle between the levers 15 and 16 on the one hand and the levers 25 and 26 on the other hand is adjusted by adjusting the position of the adjusting lever 50 relative to the lever 16 in the manner above explained.

It will be seen from the foregoing that the seat supporting mechanism is effective to resiliently and yieldingly resist the downward movement of the seat on the base and to restore the seat to its initial unweighted condition after the weight has been removed. The resiliency of the metal forming the torsion bar provides a desirable degree of yielding and resiliency so that a smooth ride is provided as the vehicle moves over the ground. The construction is such that only a small amount of space is taken up by the seat mounting members and the seat, therefore, is well adapted for use in modern-day trucks. The construction is simple and inexpensive to manufacture and install and has a relatively small number of parts. No adjustments are required and the device is capable of providing a long period of trouble-free use.

The torsion bar utilized in accordance with the present invention has a torsional spring rate of between 60 and 120 in. lbs. per degree. In other words, a torque between 60 and 120 in. lbs. would be required to twist the torsion bar one degree, depending upon the particular bar used.

The foregoing detailed description has been given for clearness of understanding only, and no unnecessary limitations should be understood therefrom, as modifications will be obvious to those skilled in the art.

I claim:

1. Seat structure comprising:
 base means;
 seat frame means located above said base means;
 a first lever extending upwardly and rearwardly from said base means to said seat frame means;
 a second lever extending downwardly and rearwardly from said seat frame means to said base means;
 means connecting one end of each of said levers to one of said base and seat frame means;
 means slidably mounting the other end of each of said levers to the other of said base and seat frame means;
 a torsion bar extending between said levers;
 means fixedly mounting one of said levers on said torsion bar at a location on said one lever between the ends thereof;
 means rotatably mounting the other of said levers on said torsion bar, at a location on said torsion bar axially spaced from said one lever, and at a location on said other lever between the ends thereof;
 and adjusting means, constituting a linkage between said torsion bar and said rotatably mounted other lever, for prepositioning the angular relationship between said levers and presetting the vertical distance between said base means and said seat frame means without pre-loading said torsion bar.

2. Seat structure as recited in claim 1 wherein:
 said connecting means comprises means pivotally mounting said one end of each lever to one of the said base and seat frame means.

3. Seat structure as recited in claim 2 and comprising:
 roller means on said other end of each of said levers.

4. Seat structure as recited in claim 1 and comprising:
 third and fourth levers each extending between said base means and said seat frame means and each parallel to one of said first and second levers;
 means connecting one end of each of said third and fourth levers to one of said base and seat frame means, said one end corresponding to the one end on the parallel lever of the first and second levers;
 means slidably mounting the other end of said third and fourth levers to the other of said base and seat frame means, said other end corresponding to the other end on the parallel lever of the first and second levers;
 and means rotatably mounting each of said third and fourth levers in axially spaced relation on said torsion bar.

5. Seat structure as recited in claim 1 wherein said adjusting means comprises:
 an adjusting lever extending radially from said torsion bar;
 means fixedly mounting one end of said adjusting lever on the torsion bar;
 an elongated element located at the other end of said adjusting lever and extending angularly and upwardly therefrom;
 means mounting said elongated element on said adjusting lever for axial movement of said element;
 and stop means, on said other lever, located above said elongated element and for abutting the upper end of said elongated element.

6. Seat structure as recited in claim 5 wherein said elongated element is a screw.

7. Seat structure comprising:
 base means;
 seat frame means spaced vertically above said base means;
 a first lever extending upwardly and rearwardly from said base means to said seat frame means;
 a second lever extending downwardly and rearwardly from said seat frame means to said base means;
 means at opposite ends of each lever mounting each of said ends on a respective one of said base and seat frame means to permit vertical movement of said seat frame means relative to said base means;
 a torsion bar extending between said levers;

means fixedly mounting one of said levers on said torsion bar at a location on said one lever between the ends thereof;

means rotatably mounting the other of said levers on said torsion bar, at a location on said torsion bar axially spaced from said one lever, and at a location on said other lever between the ends thereof;

and adjusting means, constituting a linkage between said torsion bar and said rotatably mounted other lever, for prepositioning the angular relationship between said levers and presetting the vertical distance between said base means and said seat frame means without pre-loading said torsion bar.

8. Seat structure as recited in claim 7 wherein said mounting means for the lever ends comprises:

means pivotally mounting one end of a lever to one of said base and seat frame means;

and means slidably mounting the other end of a lever to the other of said base and seat frame means.

9. Seat structure as recited in claim 7 wherein said adjusting means comprises:

an adjusting lever extending radially from said torsion bar;

means fixedly mounting one end of said adjusting lever on the torsion bar;

a screw threadedly mounted at the other end of said adjusting lever and extending angularly and upwardly therethrough;

and stop means, on said other lever, located above said elongated element and for abutting the upper end of said screw.

10. Seat structure comprising:

base means;

seat frame spaced vertically above said base means;

a torsion bar between said base means and said seat frame means;

means, connected to said base means, fixedly engaging said torsion bar;

a lever having one end connected to said seat frame means;

means rotatably mounting said lever on said torsion bar, at a location on the torsion bar axially spaced from said fixedly engaging means, and at a location on the lever remote from said one end of the lever;

said lever extending angularly between said torsion bar and the seat frame means;

and adjusting means, constituting a linkage between said torsion bar and said rotatably mounted lever, for presetting the vertical distance between said base means and said seat frame means.

11. Seat structure as recited in claim 10 wherein said adjusting means comprises:

an adjusting lever extending radially from said torsion bar;

means fixedly mounting one end of said adjusting lever on the torsion bar;

an elongated element located at the other end of said adjusting lever and extending angularly and upwardly therefrom;

means mounting said elongated element on said adjusting lever for axial movement of said element;

and stop means, on said other lever, located above said elongated element and for abutting the upper end of said elongated element.

References Cited in the file of this patent

UNITED STATES PATENTS

| | | |
|---|---|---|
| 312,775 | Walker | Feb. 24, 1885 |
| 1,734,776 | Pallenberg | Nov. 5, 1929 |
| 2,935,119 | Lie | May 3, 1960 |

FOREIGN PATENTS

| | | |
|---|---|---|
| 30,343 | France | Jan. 19, 1926 |
| 598,458 | Great Britain | Feb. 18, 1948 |

UNITED STATES PATENT OFFICE
CERTIFICATE OF CORRECTION

Patent No. 3,140,851                                July 14, 1964

Raymond A. Bilancia

It is hereby certified that error appears in the above numbered patent requiring correction and that the said Letters Patent should read as corrected below.

Column 5, line 34, after "frame" insert -- means --.

Signed and sealed this 3rd day of November 1964.

(SEAL)
Attest:

ERNEST W. SWIDER                              EDWARD J. BRENNER
Attesting Officer                                    Commissioner of Patents